Figure 1:
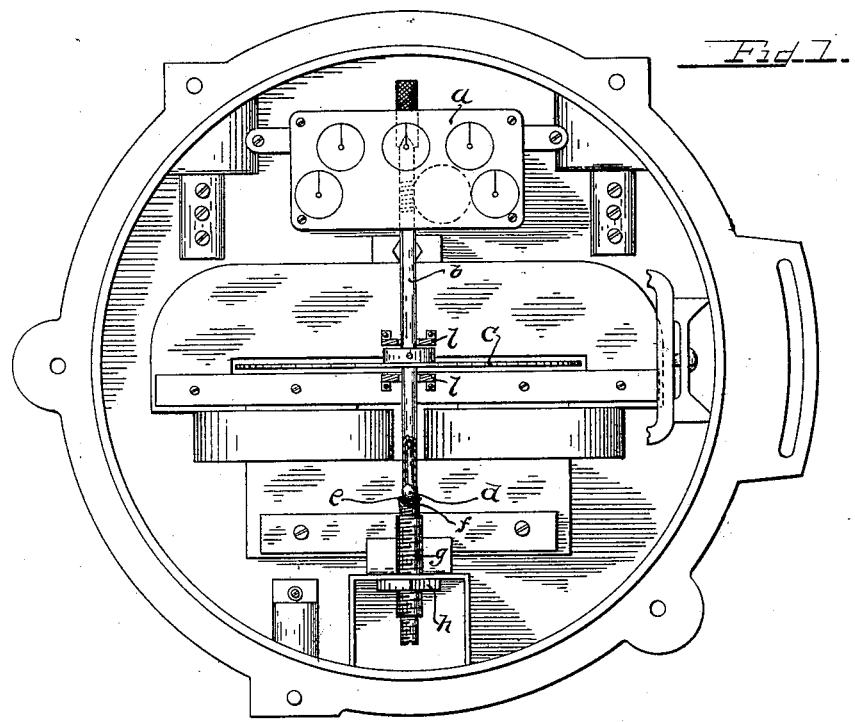

No. 658,512. Patented Sept. 25, 1900.
G. A. SCHEEFFER.
JOURNAL BEARING.
(Application filed May 15, 1900.)

(No Model.)

Witnesses
May W. Label.
H. S. Gaither.

Inventor
Gustave A. Scheeffer
By Charles A. Brown & Cragg
Attorneys

THE NORRIS PETERS CO., PHOTO-LITHO., WASHINGTON, D. C.

UNITED STATES PATENT OFFICE.

GUSTAVE A. SCHEEFFER, OF PEORIA, ILLINOIS, ASSIGNOR TO THE DIAMOND METER COMPANY, OF SAME PLACE.

JOURNAL-BEARING.

SPECIFICATION forming part of Letters Patent No. 658,512, dated September 25, 1900.

Application filed May 15, 1900. Serial No. 16,708. (No model.)

*To all whom it may concern:*

Be it known that I, GUSTAVE A. SCHEEFFER, a citizen of the United States, residing at Peoria, in the county of Peoria and State of Illinois, have invented a certain new and useful Improvement in Journal-Bearings, (Case No. 14,) of which the following is a full, clear, concise, and exact description, reference being had to the accompanying drawings, forming a part of this specification.

My invention relates to mechanisms employing rotating shafts journaled to rotate in jewel-bearings, and has for its object the construction of an improved form of bearing which will properly effect the alinement of the shaft.

My invention is particularly adaptable for use in the construction of measuring instruments, as electric meters, employing vertically-disposed rotating spindles that carry armatures, each spindle being supported at its lower end upon a lower jewel-bearing that serves to properly aline the spindle, an upper journal being employed for engaging the upper end of the spindle. After the spindle has been properly placed the meter has to be carefully calibrated to conform to the position of the bearings of the spindle and the point of pivotal engagement of the lower end of the spindle with the lower bearing. The meter after thus being carefully calibrated is ready for shipment, the spindle being removed from the lower bearing when the meter is in transit to prevent injury to the working parts. The lower jewel-bearing may be fractured, and this bearing and the engaging nut of the shaft or spindle are liable to uneven wear, which would cause the shaft to be thrown out of its proper vertical adjustment, whereupon a recalibration of the meter would be required in order that the meter may be exact. In order to avoid these difficulties, I have devised my improved construction, which in its preferred embodiment may be said to comprise, generally speaking, a spindle or shaft having a separable bearing-section designed for engagement with a bearing and a bearing adapted for engagement with this section of the shaft, so that the portion of the shaft and the bearing in engagement with the same may be both removed and replaced by similar unused parts, whereby the calibration previously effected will not be impaired.

In the preferred embodiment of my invention I employ as the separable bearing-section of the shaft or spindle a sphere composed, preferably, of hard steel, that is adapted to be engaged by a corresponding seat in the remaining section of the spindle or shaft and also by the jewel, which is preferably cup-shaped. By this construction the sphere readily alines the shaft.

I will explain my invention more fully by reference to the accompanying drawings, illustrating the preferred embodiment thereof, in which—

Figure 2:
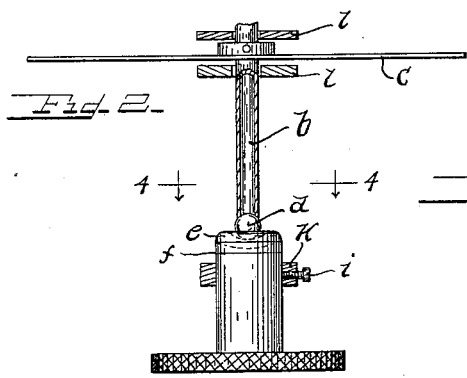
Figure 3:
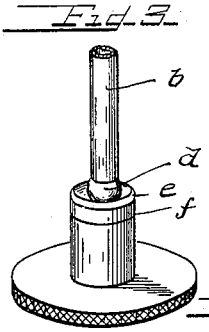
Figure 4:
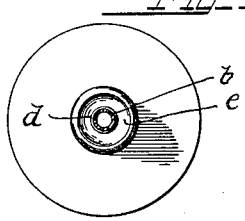

Figure 1 is a front elevation of a meter embodying the preferred form of my invention. Fig. 2 is a detailed view of a modified construction. Fig. 3 is a perspective view of a part of the structure shown in Fig. 2. Fig. 4 is a plan view on line 4 4 of Fig. 2.

Like parts are indicated by similar characters of reference throughout the different figures.

I have illustrated in Fig. 1 a type of alternating-current wattmeter to which the device of my invention may be applied. The invention, however, may have other applications. The measuring element of the meter in this instance comprises recording mechanism $a$, actuated by a spindle or shaft $b$, geared thereto, the shaft carrying an armature $c$, which in this instance is in inductive relation with the field-coils of the instrument. The sphere $d$ may be said to constitute a section of the shaft, this lower section of the shaft being received by the contiguous portion of the remainder of the shaft, which is preferably hollow, the tubular shaft being preferably provided with a seat conforming in contour to the sphere. A jewel $e$, composed of ruby, for example, is employed, in which the sphere is received. This jewel is preferably cup-shaped and may be removably secured upon a suitable support $f$, preferably by cement. The cavity of the cup-shaped bearing is of a curve having a larger radius than the sphere, so that the bearing flares wider than the sphere to afford the sphere but a single bearing-point in the cavity, so that the cavity will readily secure and maintain the shaft in proper alinement.

In Fig. 1 I have illustrated the support $f$ in the form of a screw contained within a second screw $g$ in the form of a sleeve threaded upon its interior and exterior, a nut $h$ being provided for securing the sleeve in place.

In Figs. 2, 3, and 4 the support $f$ there illustrated is preferably unthreaded, being secured in place by means of a set-screw $i$ passing through a fixed support $k$. Eyes $l\ l$ are mounted upon the frame of the meter, which serve to limit the thrust of the shaft in either direction, the upper bearing being constructed as usual to permit of the vertical elevation of the shaft to relieve the lower bearing from engagement therewith—as, for example, when the instrument is in transit.

When the sphere portion $d$ of the shaft and the jewel-bearing containing the same are incapable of securing proper alinement of the shaft, the sphere and the jewel may be removed and replaced without the necessity of recalibrating the meter, as the replaced elements will serve to restore the shaft to its proper alinement, the lower rounded portion of the shaft-section $d$ being received in the central portion of the cavity of the bearing $e$.

It is obvious that changes may be made from the particular construction herein disclosed, and I do not, therefore, wish to be limited to the precise construction shown; but,

Having thus described my invention, I claim as new and desire to secure by Letters Patent—

1. The combination with a rotatable shaft, of an armature supported thereby, the shaft being provided with a lower section in the form of a sphere, the said shaft-sections being separable, a removable cup-shaped jewel-bearing beneath the shaft, the cup-shaped cavity in the jewel-bearing serving to receive said sphere, and a vertically-adjustable support for the jewel-bearing, substantially as described.

2. The combination with a rotatable shaft, of an armature supported thereby, the shaft being provided with a lower section in the form of a sphere, the said shaft-sections being separable, and a removable cup-shaped bearing beneath the shaft, the cup-shaped cavity in the said bearing serving to receive said sphere, substantially as described.

3. The combination with a vertically-disposed shaft, of a sphere forming the lower section of the shaft and separable from the upper section of the shaft, the lower end of the upper shaft-section being provided with a seat adapted to receive the sphere, and a cup-shaped bearing for the sphere, the cup-shaped cavity in the said bearing flaring wider than the sphere and serving to receive the sphere, and to engage the same only at a point thereof coaxial with the shaft, whereby the proper alinement of the shaft is readily secured and maintained, substantially as described.

4. The combination with a vertically-disposed shaft, of a sphere forming the lower section of the shaft and separable from the upper section of the shaft, and a cup-shaped bearing for the sphere, the cup-shaped cavity in the said bearing flaring wider than the sphere and serving to receive the sphere, and to engage the same only at a point thereof coaxial with the shaft, whereby the proper alinement is readily secured and maintained, substantially as described.

In witness whereof I hereunto subscribe my name this 10th day of May, A. D. 1900.

GUSTAVE A. SCHEEFFER.

Witnesses:
A. B. FINK,
W. J. H. CRIBB.